Jan. 24, 1967  J. P. FRANZ  3,300,746
WATER COOLED SCREEN GRID RESISTOR
Filed Oct. 30, 1963  2 Sheets-Sheet 1
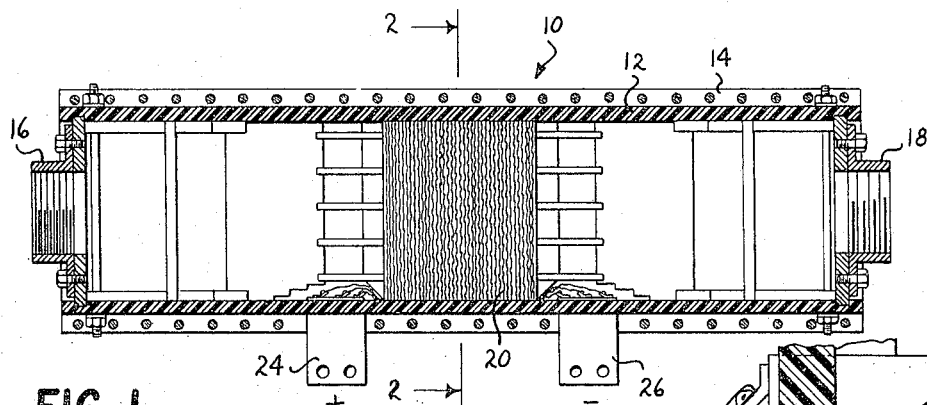
FIG. 1
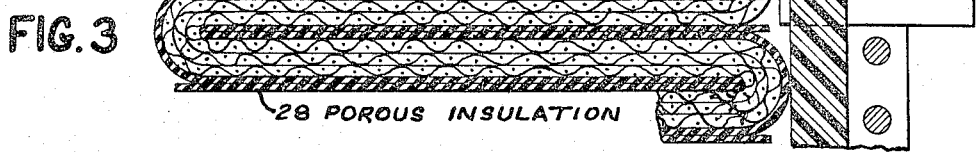
FIG. 3
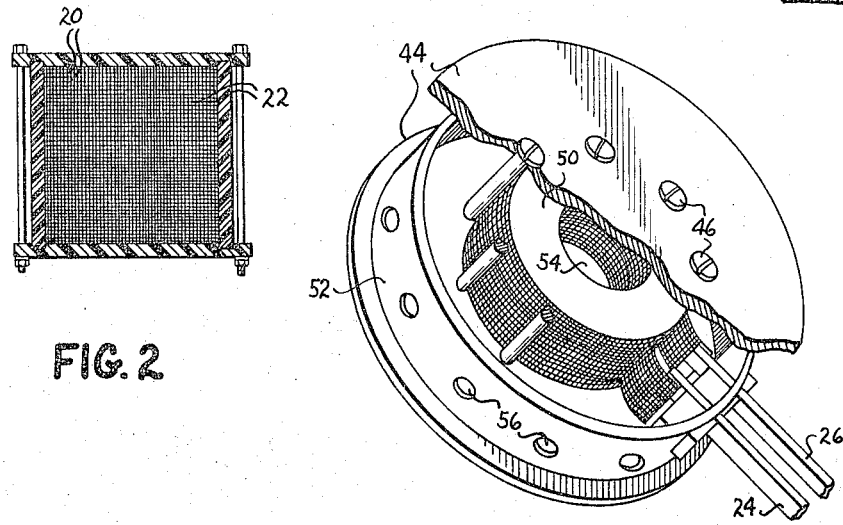
FIG. 2
FIG. 6
INVENTOR.
JOSEPH P. FRANZ
BY James R. Campbell
HIS ATTORNEY INVENTOR.
JOSEPH P. FRANZ
BY James R. Campbell
HIS ATTORNEY United States Patent Office 3,300,746
Patented Jan. 24, 1967

3,300,746
WATER COOLED SCREEN GRID RESISTOR
Joseph P. Franz, Ballston Lake, N.Y., assignor to General Electric Company, a New York corporation
Filed Oct. 30, 1963, Ser. No. 320,091
3 Claims. (Cl. 338—55)

The invention described herein relates to load resistors and more particularly to a low inductance resistor useful in testing generators having high frequency outputs.

The usual methods employed in testing most direct current machines or low frequency alternating current motors and generators provide reliable test data because well known designs of load resistors effectively absorb the power and the generated heat is carried away by water, air or other heat transfer mediums.

However, when testing high frequency A.C. generators or in attempting to determine the ripple voltage in the output of D.C. generators, for example at frequencies greater than about 500 cycles/sec., the inductance of the load resistor bears greatly on the accuracy of test results obtained. At these relatively high frequencies, the resistor stores energy in its magnetic field which is not dissipated and the voltage of the high frequency component being tested tends to reach higher values. The magnetic field energy stored in the resistor is therefore fed back into the generator because of the high inductance. When tests are made at low power factor, a significant amount of energy is circulated between the generator and the load resistor and the generator therefore is not subjected to its full load capability. At high power factors, such as unity power factor, all the energy is taken out of the system and disposed of in the form of heat.

Past constructions useful for testing high frequency equipment include coaxially disposed conductors having a space therebetween through which the water coolant is circulated. Since current flows in opposite directions in the coaxial conductors, some but not all of the cross flux is cancelled and the reactance therefore increases in step with upward changes in the equipment output frequency. This arrangement therefore comprises an intermediate inductance system which is not compatible with testing high frequency apparatus. Moreover, the system components are large and a complicated arrangement of terminals and bus-work is necessary. Also, to provide the needed flexibility in carrying out testing procedures under high current-low voltage, and vice versa, conditions, the load resistor is divided into sections, thus requiring the use of a multitude of leads and considerable effort therefore is involved when dismantling is necessary for maintenance purposes.

Liquid rheostats have been used but these also display relatively high inductance characteristics for many applications. This type of load resistor is somewhat instable because the liquid coolant becomes ionized with consequent changes in its characteristics, especially where variations in temperature and magnitude of current flow takes place.

Such prior art constructions additionally are inadequate because the steady-state heat loss capacity per unit of volume is limited by the ability of the fluid media to absorb and transfer from the environs of the conductor all of the heat generated therein.

In view of the disadvantages inherent in known load resistors and the present requirements carrying out testing procedures at high frequencies, it is evident the need exists for a compact, highly efficient, low inductance resistor and the primary object of my invention therefore is directed towards satisfying that need.

Another object of my invention is to provide a load resistor stable over a wide range of frequencies and varying characteristics of load.

Still another object of my invention is the provision of a discharge resistor simple in design and of inexpensive construction.

In carrying out my invention, I provide a screen grid resistor of an accordion pleated type disposed in a hermetic container designed for the circulation of fluid therethrough. The diameter of each conductor in the resistor screen is chosen to minimize the temperature difference between the inside and outside portions of the conductor while the grid mesh is selected to obtain thorough mixing of the liquid, thereby permitting carrying away the generated heat in a highly efficient manner. To accommodate high frequency loads furnished by an A.C. source and still obtain accurate test results, the resistor is selected to provide a low reactance regardless of the frequency of the source with which it is coupled.

While the specification concludes with claims particularly pointing out and distinctly claiming the subject matter which I regard as my invention, it is believed that the invention will be better understood from the following description taken in connection with the accompanying drawings in which:

FIGURE 1 is a plan view of the water cooled screen grid resistor showing the top cover plate removed;

FIGURE 2 is a view taken on lines 2—2 of FIGURE 1;

FIGURE 3 is an enlarged view of the screen grid conductors including terminals attached to the ends thereof;

FIGURE 6 is a modification illustrating a screen grid resistor of circular configuration.

Figure 4:
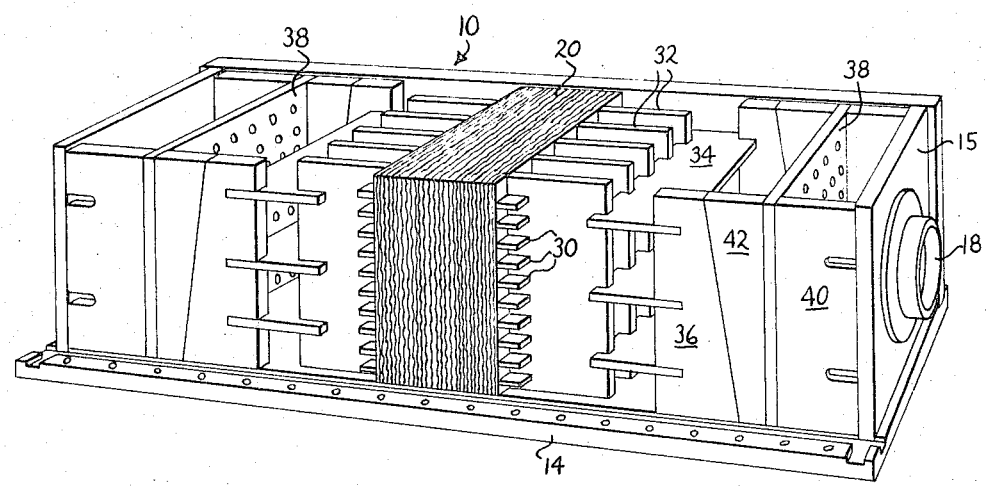
FIGURE 4 is a perspective view of the grid resistor with both the side and top plates removed for showing the disposition of the parts.

Referring now to the drawings wherein like reference characters designate like or corresponding parts throughout the several views, there is shown in FIGURES 1 through 5 a preferred design of grid resistor useful in accomplishing the objects of the invention.

As shown, the grid resistor 10 is centrally positioned in a box or container of generally rectangular configuration having sides 12 and a bottom 14, a top cover and end plates 15 made of a hard insulating material such as that identified by the trademark Textolite. A fluid inlet 16 and outlet 18 are formed in oppositely disposed end walls and the container is equipped with gaskets at appropriate points for providing the necessary watertight integrity when a liquid is circulated from the inlet 16 through the grid resistor to the outlet 18. Obviously, the inlet and outlet may be located in any of the other walls of the container.

As illustrated in FIGURES 2 and 3, the grid resistor consists of a multiplicity of parallel and longitudinally extending conducting strands 20 equipped with transversely extending spacing strands 22 of the same or other material. The design of the grid is the same as conventional fly screen used in domestic screen doors and terminals 24 and 26 are connected to the opposite ends of the longitudinal strands. The mesh thus provided by the stranded material may vary widely and one successful embodiment actually utilized fly screen as the grid resistor. Since all the longitudinal strands are joined in single positive and negative terminals at their opposite ends, it will be apparent that when the resistor is subjected to a load, current will flow only in the longitudinal strands. Since the major function of the transverse strands is to orient and maintain the longitudinal strands in position they may comprise any kind of material which will effectively perform a spacing function.

To provide a compact mass of conducting material available for absorbing the loads to which the grid resistor may be subjected, the screen grid is of long continuous length but is folded upon itself to provide a multiplicity of pleats, which when compressed together, is of a size and shape adapted for direct insertion in the water carrying container. Since an electric potential of varying magnitude will appear along the length of the screen grid, a continuous length of insulation 28, preferably of the same design and mesh as the conductor screen, is located between the adjacent pleats formed by the folded screen material. In a practical embodiment, the screens of conductor and insulating material are placed together to form two layers and the pleats for both simultaneously formed as they are folded to the desired configuration for the grid resistor.

The arrangement used for locating and holding the assembled grid resistor in position consists of a plurality of members fashioned into an egg crate design which are placed in abutting relationship with the grid resistor, as shown more clearly in FIGURE 4. A multiplicity of transversely extending strips 30 are positioned in contact with opposite sides of the screen grid and held in vertical alignment by a series of plates 32. The other end of the plates are interconnected with a series of sheets 34 which in turn are joined with vertical panels 36. A filter 38 of conventional design is spaced from the ends of the box by plates 40. The filter may also be located remotely if desired.

To impart rigidity and immovability to the interlocked parts, wedges 42 are driven into the space between the panels 36 and plates 40 on opposite sides of the container and the grid resistor to force the members together and thus take up the clearances provided by multiplicity of joints furnished by the egg crate arrangement.

It will be noted that as water is introduced into the container through inlet 16 and filtered, it follows any one of a number of parallel passageways or channels toward the grid resistor. After flowing through the resistor and accomplishing its function of absorbing heat, it then is required to flow through an identical set of channels prior to being delivered to the outlet 18.

The unique arrangement of the grid resistor permits the conductors to dissipate large quantities of heat per unit of volume as compared to conventional and prior art constructions. Because the coolant is directed into the grid resistor from the channels, each conductor is exposed for contact by the coolant thus assuring the transfer and absorption of heat to highest degree possible. By utilizing small diameter wire, the temperature differential between the inside and outside portions of each conductor is maintained at a minimum, thereby imparting long life to the resistor.

The mesh of both the conductor and insulation screens inherently causes the liquid flowing through the resistor to thoroughly mix and assume a multiplicity of different parallel flow paths, with the result, that the establishment of local hot spots is minimized, if not completely eliminated. The highly turbulent condition of the liquid therefore permits the uniform dissipation of heat by the conductors with consequent absorption by the liquid so effectively that wire having a cross section of 10 mils may be used safely. Tests indicate that the heat loss to the liquid, such as water, may be as high as 10,000 watts per cubic inch of compactly packaged screen grid with current densities in copper conductor elements as high as 650,000 amperes per square inch of conductor cross section. Although water has been mentioned as the media used for absorbing the heat energy generated within the conductors, it will be apparent that any fluid media, including gases, compatible with the environmental conditions under which operation may take place may be used. In the event a conductive fluid is circulated through the screen grid conductors, some electrolysis may occur if the potential gradient at the surface of the screen grid conductor is sufficiently high. To reduce this effect, a screen grid shield having a high resistance to eletcrolysis can be inserted where ever necessary to limit the electrolytic action on the conductor element.

One design of mesh chosen for the screen grid conductors included 14 conductors per inch extending in the longitudinal direction with 18 spacers per inch in the transverse direction. It will be apparent that the mesh of the screen may be varied as desired to accommodate the different types of fluids to which the grid resistor may be subjected.

An important aspect of this invention is that the design permits the testing of alternating current machines at relatively high frequencies, i.e., greater than about 500 cycles per second, and in testing those direct current motors and generators where the ripple frequencies are extremely high, while still providing accurate test results. As indicated previously, conventional load resistors are not capable of providing accurate test results because of the reactance established in the resistor by high frequency currents. Although the reactance varies in proportion to the frequency, it has been found that at relatively high frequencies of about 7500 cycles per second, accurate test measurements are obtainable, thus indicating that the reactance in this high frequency range has no adverse effect on the accuracy of information obtained. This condition of low reactance is attributed to the arrangement of conductors within the resistor package, and the high power density. With a pleated array of screen grid conductors, it can be visualized that all adjacent pleats will conduct current in opposite spacial directions thereby cancelling out a high percentage of the magnetic flux. The amount of cancellation is therefore dependent on the close spacing of adjacent grid pleats. The high power density attained with this arrangement reduces the length of conductor required to form the resistor, and therefore reduces the inductance a like amount. Additionally it can be seen that the flexibility afforded by a wide variety of conducting materials and choice of geometry will permit the designer to optimize for low inductance over wide ranges of current and voltage.

In a modification, the screen grid resistor is incorporated in a circular type of grid resistor as illustrated in FIGURE 6. As shown, the resistor includes a pair of oppositely disposed discs 44 held together by a plurality of bolts 46. The screen grid resistor 48 is substantially the same as that previously described in that it is equipped with longitudinally extending conductors held in spaced relationship with each other by spacers of substantially the same diameter but extending in a transverse direction. To adapt it to a circular construction, the resistor assumes the shape or configuration of a roll, as shown, and each layer is separated from the adjacent one with an insulator of the same size and preferably of substantially the same mesh as the grid resistor. The conductor leads 24 and 26 are connected to opposite ends of the grid resistor. To wind the resistor into the configuration illustrated, the mid-point of the resistor and the insulating grid are creased and then spooled into a roll with the two terminals 24 and 26 projecting outwardly from the band 52. The terminals are electrically isolated from each other and are firmly attached to the band. If the band is made of metal, the terminals should be insulated therefrom in any conventional manner. The resistor along with its insulation preferably is positioned between a second pair of discs 50 and held in its rolled condition by the bolts 46 which extend through the device. The discs 50 may be omitted if desired. A space appears between the surface of the resistor and the inside surface of a band 52 used for spacing the discs 44. An inlet 54 is provided in one of the discs 44 and after the water flows radially outward through the resistor 48 into the space, it then is discharged through openings 56 formed in the band 52. Obviously, the device of FIGURE 6 may be located in a container or other vessel for collecting the used water when the unit is in operation.

It will be apparent that the same configuration of load resistor shown in FIGURE 6 may be modified slightly to have it serve as a magnet coil. To accomplish this, the grid conductors would simply be spooled into a roll in the same manner as thread on a bobbin. One terminal end of the grid conductor then would appear inside the roll and the other terminal end on the outside of the roll. The resulting structure would comprise a magnet coil of high inductance when energized, rather than a low inductance as previously described, but would be cooled with a fluid in the same manner disclosed for the grid resistor.

Figure 5:
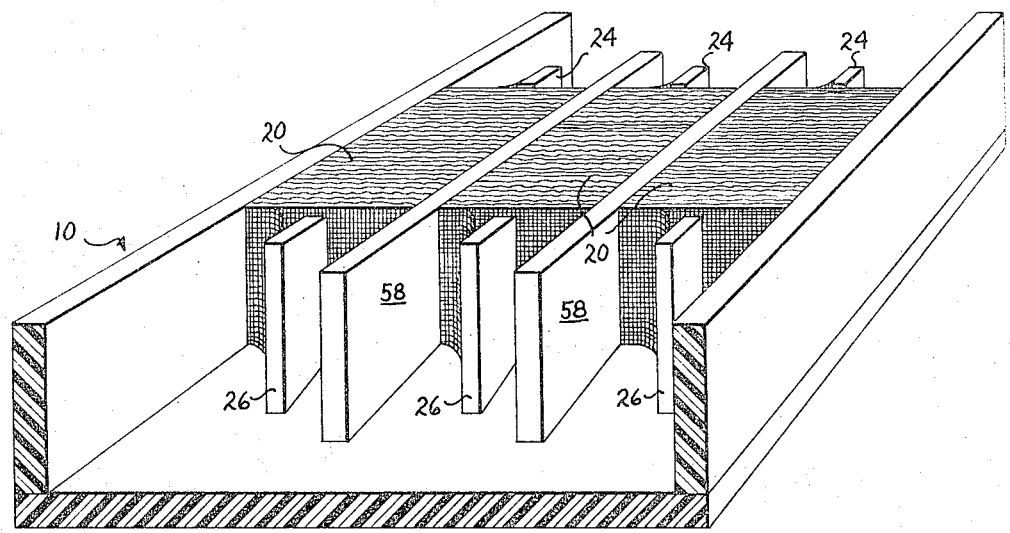
FIGURE 5 is an enlarged view of a modification illustrating the position of insulators and terminals in the three-phase grid resistor.

In order to test three-phase machines, each phase may be connected with a corresponding screen grid in the resistor 10, each being equipped with positive and negative terminals 24 and 26, as shown in the modification of FIGURE 5. Since each phase must be electrically isolated from the other, barriers 58 of electrically insulating material are positioned therebetween and are designed to extend beyond the terminals 26. A cover plate, not shown, fits tightly over the device of FIGURE 5 to furnish the needed watertight integrity while coacting with each of the barriers to form the channels for guiding water to and from the resistor. Although the connections are not shown, it will be understood the terminals 24 and 26 will be connected to corresponding conductor terminals mounted on the outer portion of the container.

In view of the above, it will be apparent that many modifications and variations are possible in light of the above teachings. It therefore is to be understood that within the scope of the appended claims, the invention may be practiced other than as specifically described.

What I claim as new and desire to secure by Letters Patent of the United States is:

1. A discharge resistor useful in testing power equipment having a high frequency output comprising:
   a hermetically sealed container having an inlet and an outlet for a cooling fluid,
   a grid resistor in said container having its opposite ends respectively terminating in first and second electric terminals mounted on the container,
   said resistor comprising a multiplicity of longitudinally extending current carrying conductors and transversely extending conductor spacing members for forming a resistor of predetermined mesh,
   said resistor being pleated along its length to form a compact mass of conductors,
   foraminous insulation disposed between said pleats for separating the longitudinally extending conductors in one pleat from those appearing in the adjacent pleat, and forming a porous structure transversely of said pleats, and
   means in said container dividing the interior portion thereof into a plurality of fluid flow paths for uniformly guiding transverse to said pleats the fluid flowing to and from said screen grid resistor while traveling through the container.

2. A discharge resistor useful in testing power equipment having a high frequency output comprising:
   a hermetically sealed container having a fluid inlet and outlet,
   a grid resistor equipped with first and second electric terminals positioned centrally in said container,
   said resistor comprising a multiplicity of longitudinally extending conductors spaced from each other by a plurality of transversely extending members, said conductors and members together forming a resistor of predetermined mesh,
   said longitudinal conductors being folded on themselves to form a series of pleats which when pressed together provide a compact mass of conductors,
   insulation means having a mesh similar to that of said conductors positioned between the adjacent pleats,
   said compact mass of conductors and insulation means comprising a mixer for imparting turbulent flow to a fluid adapted to cool the individual conductors of the resistor, and
   a plurality of fluid guiding vanes positioned on opposite sides of said resistor for guiding transverse to said pleats the fluid to and from the resistor while transversing said container.

3. A discharge resistor useful in testing power equipment having a high frequency output comprising:
   a hermetically sealed container having a fluid inlet and outlet,
   a resistor in said container comprising a wire screen of predetermined mesh folded in the form of pleats to provide a compact mass centrally positioned within said container,
   insulation means having a similar mesh disposed between the adjacent pleats of the grid resistor,
   an egg crate arrangement of plates positioned on opposite sides of said resistor for dividing the fluid flow path into a plurality of sections and thereby permitting the heat to be uniformly dissipated by said conductors to the fluid, said fluid flow path being transverse to said pleats, and
   adjustable means located between said egg creates and the end of said container for urging said plates into a rigid immovable mass capable of resisting forces tending to effect their displacement.

References Cited by the Examiner

UNITED STATES PATENTS

| 725,450 | 4/1903 | Keller | 219—382 |
|---|---|---|---|
| 1,297,814 | 3/1919 | Engelbrekt | 338—57 X |
| 2,381,724 | 8/1945 | Crosby | 338—62 X |
| 2,397,408 | 3/1946 | Crosby et al. | 338—55 |
| 2,522,542 | 9/1950 | Schaefer | 338—58 |

FOREIGN PATENTS

| 1,076,494 | 4/1954 | France. |
|---|---|---|

ANTHONY BARTIS, *Primary Examiner.*